United States Patent Office 3,432,429
Patented Mar. 11, 1969

3,432,429
METHOD FOR MAINTAINING THE TRANSFER AMOUNT OF SOLID PARTICLES IN A CONTINUOUS SOLID-LIQUID CONTACT APPARATUS AT A CONSTANT LEVEL AND APPARATUS THEREFOR
Kazuhiko Mihara, Tokyo, Takashi Yamashiki, Yokohama, and Mitsuo Takano, Kawasaki-shi, Japan, assignors to Asahi Kasei Kogyo Kabushiki Kaisha, Osaka, Japan
Continuation-in-part of application Ser. No. 273,724, Apr. 17, 1963. This application Dec. 11, 1967, Ser. No. 689,624
Claims priority, application Japan, Apr. 27, 1962, 37/21,072; Feb. 6, 1963, 38/4,727, 38/4,728
U.S. Cl. 210—33          3 Claims
Int. Cl. C02b 1/76, 1/72, 1/64

ABSTRACT OF THE DISCLOSURE

A method for transferring a constant quantity of solid particles from a first vessel to a second vessel in which a slurry is fed under pressure from the first vessel with a chamber from which supernatant liquid is withdrawn and the solid particles are accumulated in the chamber, after which the slurry feed is interrupted and the entire quantity of solids in the chamber is fed to the second vessel.

CROSS REFERENCE TO RELATED APPLICATIONS

This application is a continuation-in-part of our earlier application Ser. No. 273,724 filed Apr. 17, 1963, now abandoned.

BRIEF SUMMARY OF THE INVENTION

The present invention relates to a method and apparatus utilized in continuous solid-liquid contacting plants. More particularly, the present invention relates to a method for keeping the amount of solid particles transferred between the vessels in a continuous solid-liquid contacting plant, at a constant level, regardless of the amount of liquid transferring in company with the solid particles.

In conducting such operations as adsorption, washing, desorption, etc., by contact of solid particles with a liquid, the solid particles are continuously transferred through a number of vessels, together with the liquid. In this operation, the amount of the solid particles transferred between the vessels should be constant and at a desired and sufficient level, so that the reaction is efficient.

Ordinarily, the solid particles are transferred between vessels in a slurry state accompanying a liquid. The slurry consists of solid particles accompanying a space liquid and a liquid which is to be supernatant when allowed to stand. In a continuous ion exchanging process in which an ion exchanging resin is transferred in slurry state, for instance, 1.3 cubic meters volume of the slurry of the resin comprises, in its most closely filled state, about 0.3 cubic meter volume of a supernatant liquid and 1 cubic meter volume of solid particles including 0.5 cubic meter volume of a space liquid. Accordingly, it is necessary to measure and control the flowing amount of the slurry and the concentration of solids in the slurry, at the same time, for the control of the transfer amount of the total solid particles.

It has been proposed that the amount of transfer particles be kept at a constant level by measuring and controlling the flowing amount of a slurry rich in the solid particles by means of an electromagnetic flow meter or a throttling flow meter such as a venturi tube, and by measuring the slurry concentration at the same time. However, this type of control method is very complicated and troublesome. Moreover, the use of a throttling flow meter suffers from other disadvantages, namely the slurry concentration tends to change because of the difference of the pressure losses of the liquid and the solid particles, and the solid particles can not be transferred smoothly.

In the operation using an ion exchange resin, in general, the adsorbing reaction is slow, as compared with the regenerating reaction and the washing process. To raise the efficiency of a continuous operation, accordingly, the transfer of the slurry is frequently conducted by use of a plurality of adsorbing vessels for each assembly of a regenerating and a washing vessel. Thus, the procedure is furthermore troublesome when slurry is pumped from at least two vessels as mentioned above.

In the production of highly pure water from an industrial water by means of a continuous ion-exchange plant, the electroconductivity and the pH of the water reached are significantly influenced by the amount of the ion exchange resin transferred, so, the amount of the resin transferred should be kept at a constant level depending upon the amount of the salt to be removed from the industrial water. Hereupon, a small transfer amount of the resin suffices, since the concentration of the salt in the industrial water is low, namely the amount of the salt to be removed is small. However, the control of the transferring amount at such low level is difficult, although it is important, as compared with the case where a large amount of the resin is transferred.

The above problems have been examined from all viewpoints, and an apparatus and a method have been devised according to which the transfer amount of solid particles is kept at a constant level and the solid particles are transferred smoothly, regardless of the variation of the slurry concentration. The inventors have succeeded in accumulating and transferring the solid particles by installation of a quantifying or accumulation apparatus for solid particles between the treatment vessels.

The present invention can be considered to represent a successful solution to the transfer of solid particles in constant amount between an ion exchange vessel operating under the principles in U.S. Patent No. 3,152,072 and a regenerating vessel.

DETAILED DESCRIPTION

Figure 1:
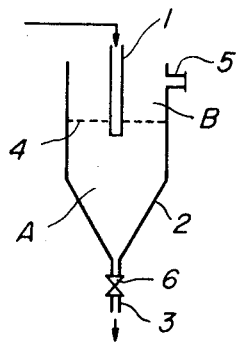
FIGURE 1 is a diagrammatic view of a particle-quantifying apparatus according to the invention.

In FIG. 1 there is shown a particle-quantifying or accumulating vessel 2 with a strainer 4 secured therein to define a chamber A therebeneath and an effluent chamber B thereabove. A vertical slurry-feeding tube 1 opens into the chamber A, while, an effluent tube 5 opens into the effluent chamber B. At the bottom of vessel 2 is an outlet tube 3 for solid particles. A valve 6 is provided in tube 3. The strainer 4 can pass liquid, but can not pass solid particles. A slurry is passed from a preceding vessel, for example a solid-liquid countercurrent continuously contacting vessel 30 (FIG. 4) to vessel 2. The slurry is introduced under pressure into chamber A of the particle-accumulating apparatus by the slurry-feeding tube 1. The liquid fraction of the slurry passes through the strainer 4 and overflows through the effluent pipe 5. When the chamber A becomes filled with solid particles from the slurry, and the pressure in the chamber A reaches the slurry feed pressure, the introduction of slurry is stopped. Namely, when the amount of the solid particles fed from the feeding tube 1 is larger than the amount withdrawn from the chamber A, the solid particles fill the chamber A in a state in which the chamber A contains particles having only space liquid and no supernatant liquid. The flow of the solid particles is then automatically stopped, while the supernatant liquid is passed through the strainer 4 and the effluent tube 5. The withdrawal of the solid particles is effected by opening the valve 6 by hand or automatically. The particles may be withdrawn partially or all at once. In general, withdrawal all at once is preferred.

The time needed for the withdrawal of the solid particles is generally short, while the time needed to transfer the solid particles from the preceding vessel and fill the vacant chamber A to the compacted state can be regulated by a suitable adjustment of the outlet valve for the particles at the preceding vessel. Accordingly, the transfer amount of the solid particles can be regulated to a definite level by adjusting the frequency of the removal over a definite period of time, provided that the solid particles are filled in the chamber A before the withdrawal and the inner volume of the accumulating apparatus is constant. In other words, the withdrawal frequency and the inner volume of the accumulating apparatus are so set that the product of the inner volume and the withdrawal frequency (for a unit period of time) is the same as the desired transfer amount of the solid particles within the unit period of time. In such manner, the transfer amount can be exactly determined and the transfer of the solid particles is effected smoothly. The inner volume of the accumulating apparatus may be varied by raising or lowering the strainer 4 which is mounted so as to be movable.

In this apparatus, an automatic operation can be effected by connecting a timer to the valve 6 to open or close the valve automatically, this being very effective for the minimization of labor.

The present method and apparatus may be applied to arrangements employing either a moving bed type or fluidized bed type of a solid-liquid continuously contacting apparatus. Especially, they are effective in cases where solid particles are transferred from a moving bed type vessel to the subsequent vessel as in U.S. Patent No. 3,152,072.

Accordingly, the valve 6 for the withdrawal of the solid particles in the accumulating apparatus is automatically regulated, and the time cycle of the automatic valve is synchronized with the time cycle of the preceding vessel which is of moving bed type. By changing the time cycle of the preceding vessel, or by changing the inner volume of the solid particle-accumulating apparatus, a sufficient amount of the particles is measured and transferred to the next vessel, regardless of the slurry concentration, and the valve is closed after the withdrawal of the particles in such a state that no particles are left in the accumulating apparatus, thereby to prevent loss of the particles as far as possible.

Figure 4:
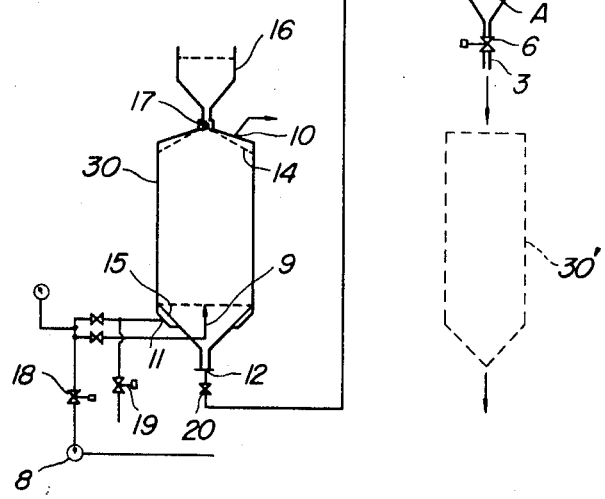
FIGURES 4, 5 and 6 are diagrammatic illustrations of the method of the present invention.

Referring to FIG. 4, the solid-liquid countercurrent continuously contacting vessel 30 of moving bed type, feeds the solid particle-accumulating apparatus 2. In the vessel 30, a liquid fed from an inlet tube 9 via a liquid pump 8 rises in the vessel, and contacts solid particles in the vessel forming a bed therein, whereby a reaction occurs. The liquid is discharged through a wire net 14 and then from a liquid outlet tube 10. The inside of the vessel is under the pressure of the liquid supplied by the pump. The solid particles with which the reaction is finished are automatically discharged, by the pressure of the liquid in the vessel, from a particle discharging outlet 12 at the bottom of the vessel, to the solid particle-accumulating apparatus 2 disposed between the vessel 30 and a subsequent vessel 30'. After a period of time of such operation, an automatic liquid valve 18 is closed and an automatic liquid-withdrawing valve 19 is simultaneously opened by the action of a cycle timer, whereby a part of the liquid in the vessel is automatically discharged by a head-difference via a wire net 15 and a liquid outlet, then through automatic valve 19. Hereupon, the discharge under pressure of the solid particles into the particle-accumulating apparatus 2 does not occur even when the quantifying apparatus is vacant, since the liquid pressure in the vessel 30 has diminished. Solid, fresh, particles filled in a hopper 16 mounted at the top of the vessel 30 are introduced into the vessel 30 via a check valve 17 by a head difference. After a suitably short period of time, the valve 19 is closed and the valve 18 is simultaneously opened, whereby the inner pressure in the vessel 30 increases, the check valve 17 is consequently closed, and the flow of the solid particles from the hopper 16 is stopped. Then, the solid particles which have completed the reaction are again discharged from the bottom of the vessel 30 and fed to the quantifying apparatus 2.

Now, in the solid particle-accumulating apparatus, the structure and the action of which are described above, the valve 6 at the particle outlet tube 3 is operated automatically, and connected with the cycle timer in the preceding vessel 30. The liquid-withdrawing valve 19 of the preceding vessel and the valve 6 of the quantifying apparatus are operated together so as to open and close at the same time. Thus, the solid particles are sent into the accumulating apparatus during the time of liquid passage in the vessel 30, and the particles are sent to the subsequent vessel 30' by the liquid pressure, upon opening of the valve 6 at the liquid-withdrawing time. Since the solid particles are not pressure-sent into the accumulating apparatus during the time of the liquid withdrawal from the valve 19, no solid particles are left in the accumulating apparatus before the valve 6 at the outlet tube 3 is again closed, if the time cycle, and the size of the tubes are so arranged that the time needed for the withdrawal of the particles from the accumulating apparatus is shorter than the time needed for the withdrawal of the liquid in the vessel 30. Thus, loss of the particles can be prevented as far as possible. For instance, when an operation is effected under a condition of 15 seconds liquid-withdrawal, the time should be so arranged that the particle withdrawal from the accumulating apparatus is finished in about 10 seconds, and the vessel remains wholly vacant for the remaining 5 seconds.

The amount of the solid particles to be measured and transferred may be adjusted by changing the time cycle of the vessel 30, keeping the volume of the accumulating apparatus at a constant level, or by changing the inner volume of the chamber A by moving the strainer 4 in the apparatus, without changing the time cycle. The latter case is adaptable to a comparatively large variation of the transferring amount.

Figure 2:
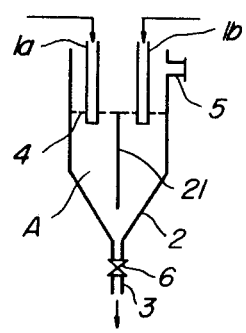
FIGURE 2 is a similar view of a modified version of a particle-quantifying apparatus, which consists of two compartments sectioned by a plate.
Figure 3:
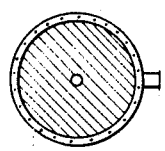
FIGURE 3 is a plan view of the particle-quantifying apparatus of FIG. 1.

In the case where there are at least two preceding vessels, a corresponding number of slurry-feeding tubes 1 are mounted in the accumulating apparatus, and the solid particles can be transferred very smoothly by provision of a baffle plate in the apparatus. FIG. 2 shows a section view of such an accumulating apparatus which has two feeding pipes 1a, 1b. A baffleplate 21 divides the apparatus 2 into two chambers. It is important for the transfer and withdrawal of slurry, that the baffleplate does not extend to the bottom of the apparatus, and leaves a space at the bottom portion of the chamber A. The distance from the end of the baffle-plate to the bottom of the chamber, is suitably from ⅛ to ⅓ of the height of the chamber A and depends upon the size of the solid particles, the number of slurry-feeding tubes, the inclination of the bottom portion of the chamber, the overall size of the apparatus, and others. Within such range of the distance, the solid particles can be transferred without extensive commingling and without deviation of the transferring amounts.

The method of the invention is more fully described with reference to the following examples, which are, however, set forth merely by way of illustration and not by way of limitation.

Example 1

Figure 5:
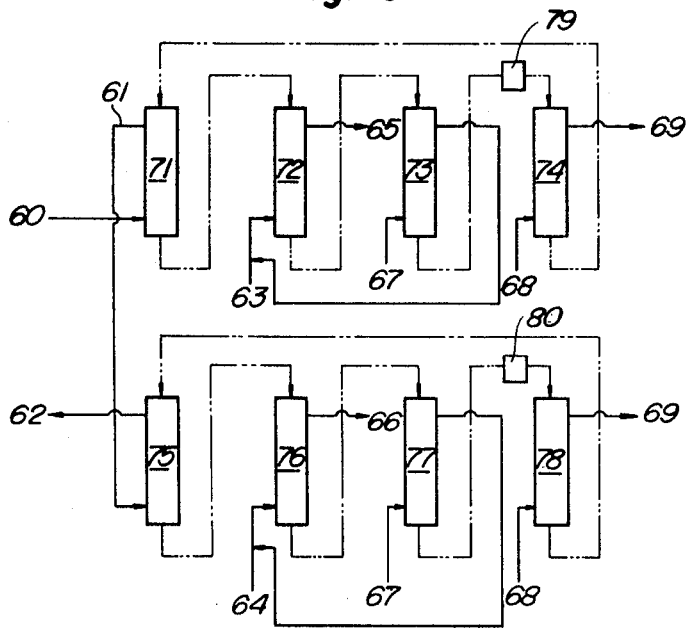

An industrial waste water having 3.56 e.p.m. ion concentration against cation exchange and 4.55 e.p.m. ion concentration against anion exchange (e.p.m. corresponding eq./m.$^3$) was treated by a process as shown in FIG. 5 at the rate of 4.75 m.$^3$/hr. The ion exchange was effected continuously by passing the water through 8 vessels of moving bed type, namely adsorbing vessels 71 and 75, regenerating vessels 72 and 76, substitution vessels 73 and 77 and washing vessels 74 and 78, respectively for cation exchange and anion exchange. The produced pure water had an electric conductivity of less than 10 $\mu$v./cm. and a SiO$_2$ content of less than 0.1 p.p.m.

In this example, the effective adsorbing amount of the cation exchange resin was 1.5 eq./l. resin and that of the anion exchange resin was 0.3 eq./l. resin. The cation and anion exchange resins were circulatingly transferred at the rates of 11.3 l./hr. and 72.0 l./hr. respectively. Between the substitution vessel and washing vessel, a solid particle-accumulating apparatus 79 or 80 was provided to measure and keep constant the transfer amount of the resin between the vessels.

The particle-withdrawing valve of the accumulating apparatus was linked with the cycle timer of the liquid-withdrawing and liquid-passing of the substitution vessel. For the withdrawal of the resin from the accumulating apparatus, all of the resin was withdrawn at every liquid withdrawal. The cation exchange resin was transferred in 30 minute cycles (29 minutes and 45 seconds of liquid-passing and 15 seconds of liquid-withdrawal) at the rate of 11.3 l./hr. by the solid particles accumulating apparatus 79 having a 5.65 l. inner volume. While, the anion exchange resin was transferred in 5 minute cycles (4 minutes and 45 seconds of liquid-passing and 15 seconds of liquid-withdrawal) at the rate of 72.0 l./hr. by the solid particles accumulating apparatus 80 having a 6.00 l. vacant chamber. The time needed for the resin-withdrawal from the accumulating apparatus was about 10 seconds which is shorter than the liquid-withdrawal time.

Raw industrial water 60 was fed to the column 71 and passed upwardly through the column. After countercurrent contact with cation resin, the treated industrial water was discharged through the pipe 61 and then introduced into the anion adsorption vessel 75 to yield a pure water product. 62.

Regenerant solutions for cation resin and anion resin were fed through pipes 63 and 64 respectively, and discharged through conduits 65 and 66.

Separation water 67 was fed into the substitution vessels 73 and 77, and washing water 68 was fed into the washing vessels 74 and 78 and exhausted through 69.

By this operation, the resins were transferred exactly and automatically, with no loss of the resins caused by the closing of the valve.

Example 2

An industrial waste water having 4.56 e.p.m. of the ion concentration against cation exchange and 5.55 e.p.m. of the ion concentration against anion exchange was treated by the same apparatus as in Example 1 to produce pure water.

The transferring amount of the cation exchange resin was 14.4 l./hr. and that of the anion exchange resin was 87.7 l./hr. The cation exchange resin was fed and withdrawn according to a time cycle of 23 minutes and 15 seconds of liquid-passing and 15 seconds of liquid-withdrawal, and transferred to the subsequent vessel at the rate of 14.4 l./hr. The anion exchange resin was fed and withdrawn according to a time cycle of 3 minutes and 51 seconds of liquid-passing and 15 seconds of liquid-withdrawing, and transferred to the subsequent vessel at the rate of 87.7 l./hr.

Example 3

In the same procedure as in Example 2, the transfer amount of the respective resin was varied by variation of the inner volume of the vacant chamber by moving the movable strainer in the accumulating apparatus, without changing the time cycle.

The volume of the vacant chamber of the cation exchange resin-accumulating apparatus was changed to 7.20 l. by raising the strainer, and that the anion exchange resin-accumulating apparatus was changed to 7.30 l. By transferring the resin according to the same time cycle as in Example 2, the transfer amounts of the resins were varied.

Example 4

Reference will now be made to resin transfer in the case where copper is recovered in the form of copper sulfate from a dilute aqueous ammonium sulfate solution obtained in a cupro-ammonium rayon process by neutralization of the waste liquor and the waste acid at the spinning step.

Figure 6:
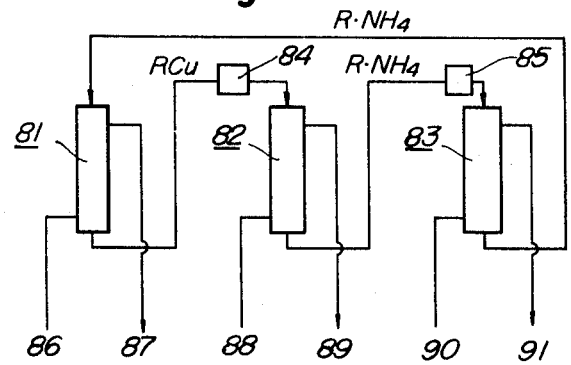

FIG. 6 is a flow diagram showing the process of this example. The liquid-passing vessel 81 is comprised of five vessels, and the regenerating vessel 82 and washing vessel 83 were respectively single vessels. Between the liquid-passing vessel 81 and the regenerating vessel 82 and between the regenerating vessel 82 and the washing vessel 83, the solid particles-accumulating apparatus 94 and 85 were installed.

The liquid-passing vessel and the regenerating vessel were of the moving bed type as described above. The time cycle of the feeding and withdrawal of the solid particles in the accumulating apparatus 85 were synchronized with that of the liquid-passing and -withdrawal of the regenerating vessel.

An aqueous ammonium sulfate solution 86

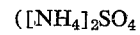

750 p.p.m. as NH$_3$ and Cu: 35 p.p.m.) at the rate of 600 m.$^3$/hr. was passed to each liquid passing vessel at the rate of 125 m.$^3$/hr., in which it was contacted countercurrently with an NH$_4$ type, strongly acidic cation exchange resin, Diaion SKIA (trade name, 20 g. cu./l. resin of effective adsorbing amount) passed at the rate of 210 l./hr. The spent sulfate solution was withdrawn at 87. The resin converted to Cu-type and passed at the rate of 1.05 m.$^3$/hr. was countercurrently contacted in the regenerating vessel with an ammonium sulfate solution 88 containing 70 g. of (NH$_4$)$_2$SO$_4$ per liter, passed at the rate of 2.19 m.$^3$/hr. The Cu was recovered in the form of a copper sulfate solution 89, and the resin converted to R—NH$_4$ type was washed in the washing vessel 83 with a wash liquid 90 and again recycled to the liquid-passing vessel. Spent wash liquid was recovered at 91.

The solid particles-accumulating apparatus 84 between the liquid passing vessel and the regenerating vessel had a vacant chamber having 150 l. inner volume, which was divided into five equal portions by baffle-plates, since the preceding liquid-passing vessel comprised five vessels. The deviation of the transfer amounts from each vessel was prevented by such device. From each liquid-passing vessel to the regenerating vessel, the resin was transferred at the rate of 210 l./hr. by 87.5 l./cycle, the time cycle of the regenerating vessel being 5 minutes. In other words, the regenerating vessel was operated in 5 minute cycles (4 minutes and 45 seconds of liquid-passing and 15 seconds of liquid-withdrawal). The solid particle-accumulating vessel 85 between the regenerating vessel and the washing vessel had a vacant chamber of 87.5 l. inner volume, and the resin was withdrawn all at once. With a cycle of 12 times/hr., 210 l./hr. of the resin was exactly measured and transferred to the subsequent vessel.

What is claimed is:

1. In a process for carrying out continuous ion exchange by countercurrent contact of a granular ion exchange resin with a liquid to be treated, wherein liquid to be treated is introduced into a vertical zone of an adsorbing vessel containing granular ion exchange resin, the liquid being introduced near the bottom of said zone and passing upwards to compact the granular ion exchange resin located above the said liquid-introducing level and form a compact, bed-like upper layer, the treated liquid being withdrawn from an outlet located above the region of ion exchange in said zone, while simultaneously a lower layer consisting of waste resin located below the liquid-introducing level is discharged under the pressure of the liquid whereby a void zone is formed between the said upper layer and the lower layer which is filled only with the said liquid to be treated, the introduction of liquid being interrupted for a relatively short period of time, while simultaneously the liquid in said void zone is discharged whereby the pressure is decreased within said vertical zone and the discharge of said lower layer is terminated while the said upper layer descends and resin accompanying liquid is introduced at the upper part of the vertical zone to fill the space produced by the descent of the upper layer, the introduction of liquid being resumed after a predetermined amount of resin and liquid has been introduced, said granular ion exchange resin being transferred to a regeneration vessel from the adsorbing vessel, and to a washing vessel from the regeneration vessel and back to the adsorbing vessel, an improvement for maintaining the transfer amount of the granular ion exchange resin substantially constant, said improvement comprising providing a resin accumulating apparatus between two of said vessels; feeding the resin to said apparatus from a preceding vessel under the pressure exerted by the liquid fed into the preceding vessel; withdrawing the supernatant liquid accompanying the resin from an outlet provided at a level above a horizontal strainer, which divides the apparatus into a lower resin chamber and the upper chamber for supernatant liquid; the resin chamber being filled with the resin, whereby the resin introduction into the apparatus is terminated; discharging the entire quantity of resin in said resin chamber within a relatively short period of time; repeating the above feeding and discharging of the resin to and from the resin chamber at predetermined regular intervals thereby maintaining the amount of resin to be transferred from one vessel to another substantially constant.

2. An improvement as claimed in claim 1 comprising preventing resin introduction into the resin chamber of the apparatus from the preceding vessel during the discharging of the resin from said chamber by opening a valve for the discharge of the resin in said chamber only when the feed of the solution to be treated into the preceding vessel is interrupted at which time the resin discharge from said vessel is also interrupted.

3. An improvement as claimed in claim 1, wherein the volume of the resin chamber is adjustable by adjusting the level of the horizontal strainer.

References Cited

UNITED STATES PATENTS 3,152,072   10/1964   Yomiyama et al.     210—33
3,208,934   9/1965   Kingsbury     210—33

SAMIH N. ZAHARNA, *Primary Examiner.*

U.S. Cl. X.R.

210—189, 306; 23—310